United States Patent [19]

Nakagawa et al.

[11] 4,291,335
[45] Sep. 22, 1981

[54] VERTICAL SYNCHRONIZING SIGNAL DETECTOR

[75] Inventors: Isao Nakagawa, Katsuta; Norio Minami, Mito, both of Japan

[73] Assignee: Hitachi, Ltd., Tokyo, Japan

[21] Appl. No.: 98,632

[22] Filed: Nov. 29, 1979

[30] Foreign Application Priority Data

Dec. 1, 1978 [JP] Japan .................. 53-147888

[51] Int. Cl.³ .............................. H04N 5/10
[52] U.S. Cl. .................................... 358/154
[58] Field of Search .................. 358/154, 21 V

[56] References Cited

U.S. PATENT DOCUMENTS 3,925,613 12/1975 Kokado .................. 358/154

FOREIGN PATENT DOCUMENTS 52-149430 12/1977 Japan .
52-150932 12/1977 Japan .
53-82121 7/1978 Japan .

Primary Examiner—John C. Martin
Attorney, Agent, or Firm—Craig and Antonelli

[57] ABSTRACT

A composite synchronizing signal is applied to the D input terminal of a D type flip-flop. A multiplied pulse obtained by multiplying a horizontal reference signal by 40 is applied to the C input terminal thereof, the horizontal reference being in phase with the horizontal synchronizing pulse of the composite synchronizing signal. A logic product of the output of a flip-flop and the multiplied pulse is produced. Pulses in the form of the logic product are counted during a period between two adjacent horizontal reference pulses. A detection pulse is generated which rises when the count exceeds 28 and ends with the end of the later one of two adjacent horizontal reference pulses. In response to this detection pulse, a vertical synchronizing pulse is detected. The timing of the ending of the detection pulse is not affected by noise pulses.

5 Claims, 3 Drawing Figures

VERTICAL SYNCHRONIZING SIGNAL DETECTOR

BACKGROUND OF THE INVENTION

1. Field of the Invention

This invention relates to a vertical synchronizing signal detector used for the video tape recorder for recording or reproducing a color television signal having a VIR signal.

2. Description of the Prior Art

In the video tape recorder for recording and reproduction without guard bands, crosstalks occur between color signals. Therefore, a comb-shaped filter having a delay circuit of one horizontal period is provided in the color signal system for the purpose of special signal processing, thus removing the crosstalks. In the case where the color television signal having a VIR signal inserted in the 19th horizontal period is recorded or reproduced in a video tape recorder having a comb-shaped filter, the video tape recorder fails to produce a correct VIR signal. In reproducing the output signal of the video tape recorder by a television receiver which automatically corrects the color level or hue by means of the VIR signal, the color signal is controlled by an incorrect VIR signal, thus making it impossible to produce an image of a correct color tone. For this reason, Japanese Patent Laid-Open No. 149430/77 discloses, for instance, a system in which a VIR signal is adapted to be produced also in the 18th horizontal period. This VIR signal is inserted in the 18th horizontal period thereby to perform the right recording and reproduction of the VIR signal. Further, a system in which the VIR signal inserted in the 19th horizontal period is erased is disclosed in Japanese Patent Laid-Open No. 150932/77. In both cases, however, unless the horizontal periods are counted correctly, the VIR signal may be inserted in an undesired horizontal period or the VIR signal in the 19th horizontal period may fail to be erased, thus making it impossible to produce a reproduced image of correct color tone. In order to count the horizontal periods correctly, it is necessary to detect the field accurately. For this purpose, a vertical synchronizing signal must be detected accurately.

In an ordinary television receiver, the separator circuit for separating a vertical synchronizing signal from a composite synchronizing signal including the horizontal synchronizing signal, equalizing pulses and vertical synchronizing signal comprises a filter and a discriminator circuit for discriminating the filter output level. This separator circuit is such that the threshold level and the time constant of the filter are not stable against changes in temperature, so that the vertical synchronizing signal cannot be detected accurately.

With the intention to obviate this problem, a vertical synchronizing signal detector circuit for detecting a vertical synchronizing signal by use of a digital circuit is disclosed in Japanese Patent Laid-Open No. 82121/78. In this known vertical synchronizing signal detector, by utilizing the difference in pulse width between the horizontal synchronizing pulse, equalizing pulses and vertical synchronizing pulses, clock pulses of predetermined frequency generated during respective pulse widths are counted, so that from the resulting counts, the vertical synchronizing pulses are detected. In the case where this known vertical synchronizing signal detector circuit is used in an ordinary video tape recorder not provided with a circuit for eliminating noise pulses mixed with the composite synchronizing signal, the noise pulses are also counted with the result that a horizontal period in which noise pulses are generated may be wrongly taken as vertical synchronizing pulses. In view of the interlaced scanning in the television receiver, this known vertical synchronizing signal detector circuit detects the starting or ending point of the vertical synchronizing pulse. Therefore, between successive fields, the generation of the detection signal is displaced by ½ horizontal period, thus making it impossible to correctly count the horizontal periods.

SUMMARY OF THE INVENTION

An object of the present invention is to provide a vertical synchronizing signal detector capable of detecting the starting point of a field correctly.

In order to achieve the above-mentioned object, there is provided according to the present invention a vertical synchronizing signal detector comprising means for latching the level of the composite synchronizing signal applied at the changing time of a rise or fall of a clock pulse of a predetermined frequency higher than the horizontal frequency, till the changing time of the next clock pulse, an AND gate impressed with the output signal of the latch means and the clock pulses, means for counting the output signal of the AND gate, said counting means being reset at the rise time of the synchronizing signal, and count detector means which fails to generate a detection signal when the count of the counting means is smaller than a predetermined number of clock pulses, and generates a detection signal when the count of the counter means exceeds the predetermined number of clock pulses, whereby the count value which otherwise might be increased by the noise pulses mixed with the composite synchronizing signal is suppressed, thereby making it possible to detect the horizontal period of a predetermined sequence in all fields.

DESCRIPTION OF THE PREFERRED EMBODIMENTS

Figure 1:
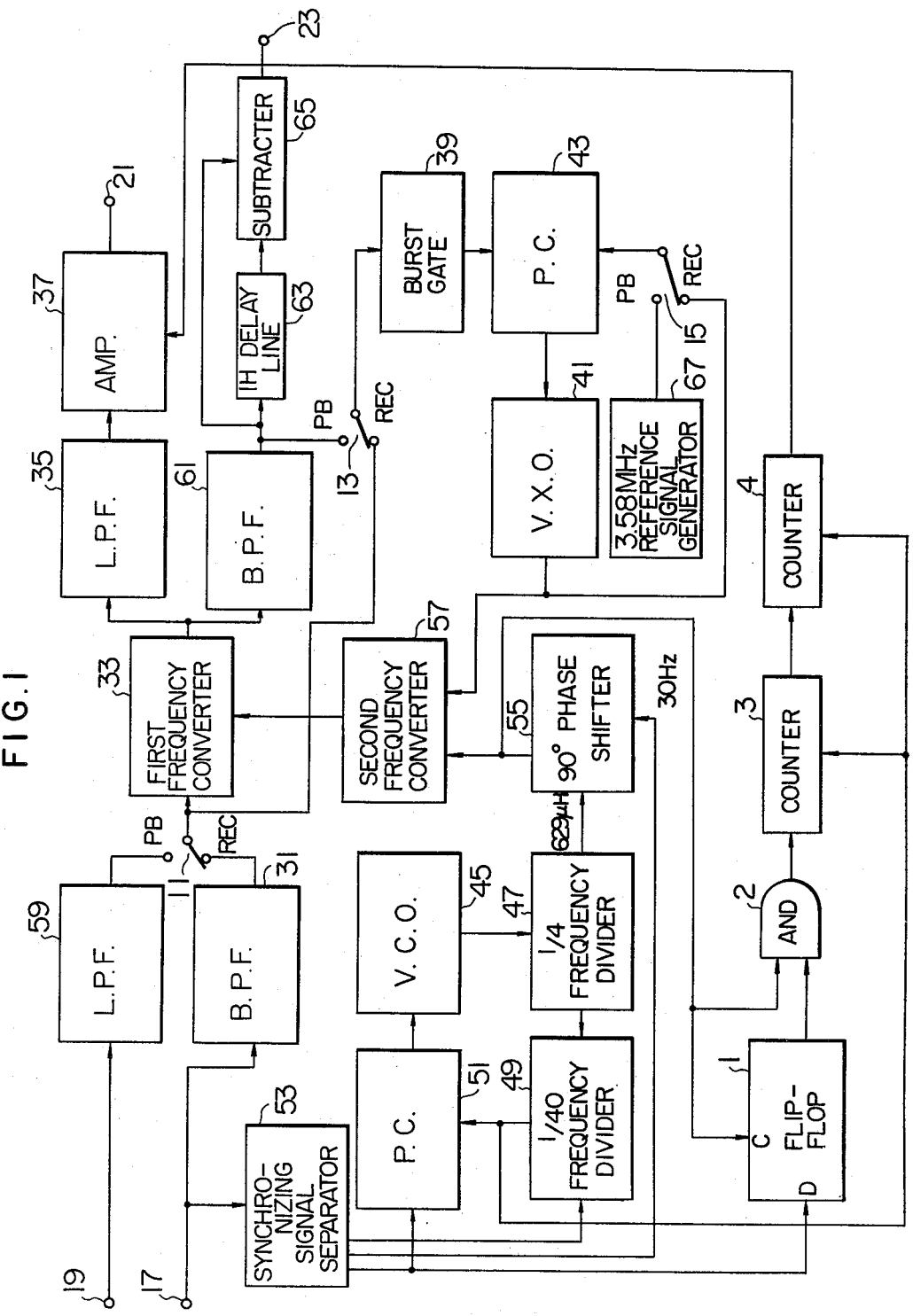
FIG. 1 is a block diagram showing an embodiment of the vertical synchronizing signal detector according to the present invention.

In FIG. 1, the parts excluding a D type flip-flop 1, an AND gate 2, and counters 3 and 4 make up a block of the recording-reproduction system of Video Tape Recorder VT5000 of phase shift type made by Hitachi, Ltd., which was placed on only the Japanese markets before the date on which the priority right was claimed. First, the block of this tape recorder VT5000 will be explained.

At the time of recording, the recording-reproduction change-over switches 11, 13 and 15 are turned to REC side as shown, and the input terminal 17 is impressed with a composite color image video signal. The carrier chrominance signal separated from the composite color video signal by the band-pass filter (B.P.F.) 31 is frequency-converted into a lower frequency by a first frequency converter 33, and introduced to the output terminal 21 through a low-pass filter (L.P.F.) 35 and an amplifier (AMP.) 37. This low-frequency color signal is mixed with an FM luminance signal, and the mixed signal is supplied to the video head and recorded on the magnetic tape. The burst signal in the composite color video signal is taken out by the burst gate 39, and the phase thereof compared with that of the oscillation output of the variable crystal oscillator (V.X.O.) 41 of 3.58 MHz in the phase comparator (P.C.) 43. The phase detection signal produced from the phase comparator 43 is used for automatically controlling the phase of the oscillation output of the oscillator 41.

The voltage controlled oscillator (V.C.O.) 45 oscillates at 160 $f_H$ ($f_H$ is a horizontal frequency), and the oscillation output is frequency-divided into 40 $f_H$ by the ¼ frequency divider 47, and after being further divided by the 1/40 frequency divider 49, applied to the phase comparator (P.C.) 51. The phase comparator 51 compares the phase of the horizontal synchronizing signal in the composite synchronizing signal from the synchronizing signal separator 53 with the phase of the output signal of the frequency divider 49, thereby stabilizing the oscillation frequency of the oscillator 45. The signal of 40 $f_H$, i.e. about 629 KHz from the frequency divider 47 is advanced or retarded continuously by 90 degrees for each horizontal period by means of a 90° phase shifter 55, and supplied to the second frequency converter 57. The 90-degree advance or retardation in phase is switched for each field by the 30 Hz vertical synchronizing signal produced from the synchronizing signal separator 53. Separation of the vertical synchronizing signal does not require a high accuracy and is sufficiently accomplished by an ordinary separator including an integrator and a discriminator for discriminating the magnitude of the output of the integrator. In response to the 629 KHz signal advanced or retarded by 90 degrees for each horizontal period and the 3.58 MHz signal from the oscillator 41, the second frequency converter 57 generates a 4.21 MHz signal advanced or retarded by 90 degrees for each horizontal period, which signal is supplied to the first frequency converter 33. In response to the carrier chrominance signal from the band-pass filter 31 and the 4.21 MHz signal from the frequency converter 57, the first frequency converter 33 generates a low frequency chrominance signal of 629 KHz which shifts in phase by 90 degrees for each horizontal period and which is reversed in phase shifting direction for each field.

At the time of reproduction, the recording-reproduction change-over switches 11, 13 and 15 are turned to PB side, and the input terminal 19 is supplied with a read signal including the phase-shifted low frequency chrominance signal from the magnetic head. On the other hand, the input terminal 17 is impressed with a luminance signal which has been read from the magnetic tape and has been FM-demodulated. The read signal is applied to the low-pass filter 59 which produces at the output thereof a low frequency signal separated from the FM luminance signal. This low frequency chrominance signal is frequency converted into 3.58 MHz by the first frequency converter 33, so that the unrequired frequency components thereof are removed by the band-pass filter 61. The resulting signal is applied to the comb-shaped filter including a 1 H delay line 63 having the delay time of one horizontal period and a subtractor 65. A carrier chrominance signal free from crosstalks between adjacent tracks is produced at the output terminal 23 of the comb-shaped filter. The phase detector 43 compares the phase of the burst signal extracted from the output signal of the band-pass filter 61 with the phase of the reference signal produced from the 3.58 MHz reference signal generator 67, and by use of the resulting output signal thereof, regulates the oscillator 41. The operations of the 90-degree phase shift for each horizontal period, the reversal of phase-shifting direction for each field and the comb-shaped filter make it possible to produce a carrier signal free from crosstalks between adjacent tracks.

In the case where a color television signal with a VIR signal inserted in the 19th horizontal period and with no signal inserted in the 18th and 20th horizontal periods is applied through a comb-shaped filter, for example, the output level thereof is one half that of the video period during which a color signal considered the same in successive horizontal periods is supplied. It is therefore necessary to prevent the reproduction image from being disturbed by the VIR signal in such a manner that the VIR signal is not recorded with the output of the amplifier 37 stopped or that the amplification degree is doubled during the 19th horizontal period of recording, in the event of recording or reproduction of the color television signal containing the VIR signal. For this purpose, the 19th horizontal period is required to be detected accurately and hence to detect the start of the frame accurately. The detection of the vertical synchronizing signal will be explained below.

The C input terminal of the D type flip-flop 1 is impressed with a 40 $f_H$ signal from the 90-degree phase shifter 55, while the D input terminal thereof is supplied with a composite signal of the synchronizing signal separator 53. The D type flip-flop 1 is for producing and holding the input level of the D input terminal at the time of fall of the clock pulse supplied to the C input terminal, till the fall time of the next clock pulse. Since the clock signal has the frequency of 40 $f_H$, 40 clock pulses are produced during one horizontal period.

About 36 clock pulses are generated during the total period of two vertical synchronizing pulses with a serrated pulse therebetween (total pulse period of the fourth and fifth horizontal periods of two successive fields and the sixth horizontal period of one of the odd-numbered and even-numbered fields); about 20 clock pulses are generated during the total pulse period including one horizontal synchronizing pulse and one vertical synchronizing pulse (the third and sixth horizontal periods of the other of the odd-numbered and even-numbered fields); and about three clock pulses are generated during the horizontal synchronizing pulse period. The AND gate 2 is impressed with the 40 $f_H$ clock pulse and the output of the D type flip-flop 1, so that the AND gate 2 produces 36, 20 or 3 pulses respectively during one horizontal period in the absence of noise pulses in the composite synchronizing signal. The counter 3 is reset by the frequency-divided signal of horizontal frequency from the 1/40 frequency divider 49, and counts the output pulses from the AND gate 2. When the count exceeds 28, the detection signal is applied from the counter 3 to the counter 4. Thus this detection signal is generated during the fourth horizontal period. From the time point of generation of this detection signal, the counter 4 counts the pulse signal of horizontal frequency produced from the frequency divider 49, and with the arrival of the 19th horizontal period, stops the output of the amplifier 37 during the same period by supplying a killer signal to the amplifier 37. As a result, the VIR signal is erased from the output of the amplifier 37.

When the clock frequency is $nf_H$, the count from the generation of the detection signal is selected in the range larger than $\frac{1}{2} \cdot n$ and smaller than n. In view of the fact that the count varies due to noises or like, the count at the time of generation of the detection signal is desirably selected to be 60 to 80% of n, or, more in detail from 70 to 75% of n.

The D type flip-flop prevents one clock frequency from being counted a plurality of times by noise pulses higher in frequency than the clock pulses. In other words, the output of the D type flip-flop 1 takes the level of the composite synchronizing signal associated with the change in rise or fall of the clock signal, and this level is maintained till the change in the next clock signal. Therefore, noise pulses generated at other than the time of change in clock pulses are not counted, with the result that one clock pulse is counted as one even if a number of noise pulses are generated. In this way, the construction of the counter 3 can be simplified, since the malfunction which otherwise might occur due to noise pulses can be prevented even if the frequency of the clock pulses is reduced.

The clock signal may take the form of an output of the frequency-divider 47 or the output of the oscillator 45 higher in frequency than the output of the frequency divider 47 instead of the output of the 90-degree phase shifter 55.

Figure 2:
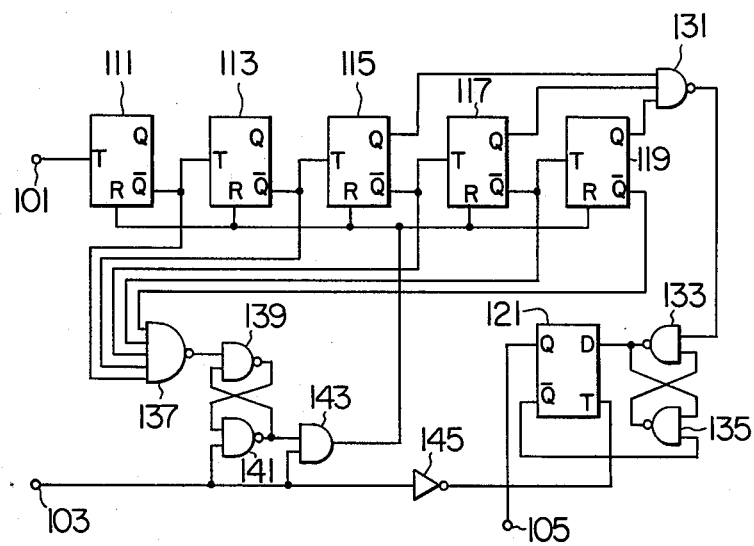
FIG. 2 is a block diagram showing the counter of FIG. 1 in detail.

A circuit as shown in FIG. 2 may be used as the counter circuit 3. The circuit of FIG. 2 uses the output of the ¼ frequency divider 47 or the output of the phase shifter 55. It is so constructed as to produce an output in response to 28 or more pulses (70%) applied to the input terminal 101. Numerals 111 to 119 show T flip-flops for dividing the frequency of input pulses by one half. The R terminals of the flip-flops 111 to 119 make up reset terminals for reducing the Q output to low level.

Figure 3:
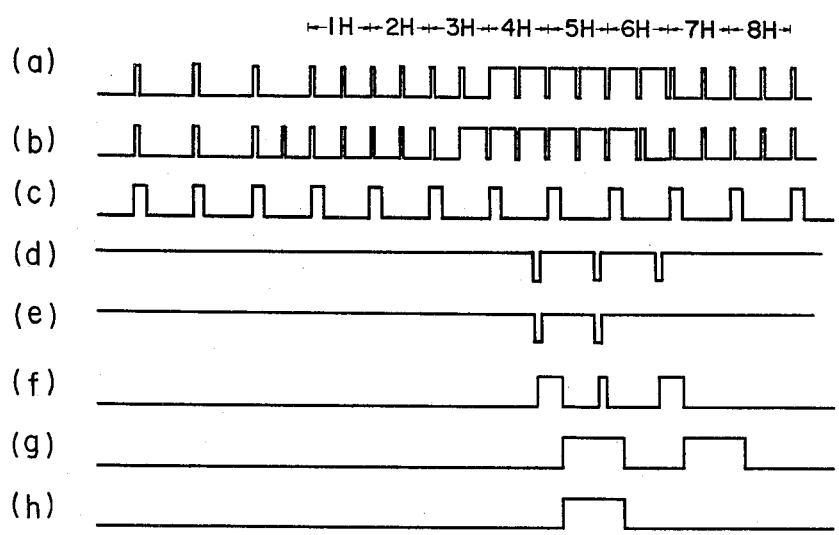
FIG. 3 is a diagram showing voltage waveforms generated at the essential parts in the block diagram of FIG. 2.

As seen from FIG. 3(c), the output waveform of horizontal frequency of the 1/40 frequency divider 49 has a pulse width of about 13 μs (1/5·H) and its front edge or rise portion is set in such a manner as to be positioned 2 to 3 μs before the front edge or rise portion of the horizontal synchronizing pulses of FIGS. 3(a) and 3(b). These horizontal synchronizing pulses are applied to the input terminal 103 and used as a reset pulse for the flip-flops 111 to 119. If they continue to be reset during the pulse period of 1/5·H, however, the operation of the counter circuit 3 is limited to the remaining 4/5·H conveniently. Therefore, the resetting operation must be performed only at the front edge of the pulses. To attain this object, a differentiator circuit is generally inserted. The capacitor which is ordinarily used with a resistor to make up a differentiator circuit, however, is not generally easily incorporated into an IC at low cost for the reason of a large area required of the chip. In a differentiator circuit using the delay of a gate, on the other hand, it is necessary to enlarge the width of the differentiation pulse in the case where a multiplicity of flip-flops are reset at the same time, thus increasing the stages of gates undesirably. Further, if $I^2L$ is used as a logic element, the disadvantage is that as well known, the operating speed thereof depends on the number of output collectors, the position of the output collectors from the injector line, and also the processing conditions. In the case where the delay of a gate is used for the differentiator circuit using $I^2L$, therefore, the circuit design is so difficult that a sufficient number of gates in the delay stage are required.

In order to avoid the above-mentioned problems, the present invention employs a circuit having gates 137 to 143. In this circuit, the reset condition of all the flip-flops 111 to 119 is detected, whereby the reset condition is cancelled, thus making possible accurate resetting with a small number of gates. The operation of this circuit will be briefly explained below.

The NAND gates 139 and 141 make up a set-reset flip-flop. The output of the gate 141 produces a low-level signal when the output of the NAND gate 137 becomes low in level, and it produces a high level signal when the input to the input terminal 103 becomes low in level. At the time point a little before the front edge of the 1/40 frequency-divider 49, the flip-flops 111 to 119 are counting, and at least one of the Q outputs thereof is low in level, while the output of the gate 137 is high in level. The output of the 1/40 frequency divider circuit 49 applied from the input terminal 103, on the other hand, is low in level, and therefore the output from the gate 141 is high in level. Under this condition, the output of the gate 141 among the inputs to the AND gate 143 is high in level while the input to the input terminal 103 is low in level, so that the output of the gate 143 is low in level. Even when the input to the input terminal 103 becomes high in level, the output of the gate 139 remains low and therefore the output of the gate 141 also remains high. Thus the two inputs to the gate 143 are high, with the result that the output of the gate 143 becomes high in level, thus resetting all the flip-flops 111 to 119. As a consequence, all the inputs to the gate 137 become high, while the output of the gate 137 becomes low. For this reason, the output of the gate 139 becomes high, so that the inputs to the gate 141 both become high in level, and the output the thereof becomes low. Thus the output of the gate 143 becomes low, thereby cancelling the reset condition. In this way, when the flip-flop 111 to 119 are reset, this reset condition is immediately cancelled.

As seen from the foregoing description, the flip-flops 111 to 119 are reset for a short length of time a little before the horizontal period, and therefore input pulses substantially for one horizontal period are counted. In the 4th horizontal period of the vertical blanking period, the horizontal periods of both fields are high in level except for short serrated pulse periods (a total of about 6 μs for the two), and therefore are supplied with about 36 pulses in total, as shown in FIGS. 3(a) and 3(b). At the time point equivalent to ¾ of this number, 28 pulses are applied, when all the Q outputs of the flip-flops 115 to 119 become high in level, while the output of the three-input NAND gate 131 becomes low in level as shown in FIGS. 3(d) and 3(e).

In principle, vertical pulses are detected. When some counting error occurs due to noises or the like, however, the timing of this pulse is displaced slightly. In order to assure stable generation of this pulse, a circuit comprising the D type flip-flop 121, the NAND gates 133 and 135 and the inverter 145 is used. The circuit operation of this part will be briefly explained below.

The D type flip-flop 121 operates in such a manner that the D input thereof is transmitted to the Q output and the reverse polarity of the D input is transmitted to the Q output of the rear edge of the pulse shown in FIG. 3(c). As a result, as long as the output of the gate 133 is low in level, the Q outputs of the flip-flop 121 remain low and high in level respectively. Under this condition, the output of the gate 135 is high, and therefore, when the gate 131 becomes low, the output of the gate 133 becomes high as shown in FIG. 3(f), while the output of the gate 135 becomes low in level. Even when the output of the gate 131 is restored to high level, the output of the gate 133 remains high. If the rear edge of the pulse of FIG. 3(c) is reached under this condition, Q output of the flip-flop 121 becomes high, while the $\bar{Q}$ output thereof becomes low. Since this $\bar{Q}$ output is returned to the gate 135, the output of the gate 135 becomes high, so that the output of the gate 135 becomes low in level.

In this way, the Q output of the flip-flop 121 introduced to the output 105 makes up a pulse which rises at the rear edge of a pulse of FIG. 3(c) in the beginning of the fifth horizontal period. The pulse of FIG. 3(c) is in phase with the horizontal synchronizing signal, and therefore the timing thereof is very stable.

Also in the fifth horizontal period, the output of the gate 131 becomes low in level, thus raising the output of the gate to high level. At this time, however, the Q output is low, so that when the output of the gate 131 is restored to high level, the output of the gate 133 is returned to low level immediately. As a result, when the rear portion or edge of the pulse of FIG. 3(c) is applied, the output of the gate 133 has already been restored to low level, so that the Q and $\bar{Q}$ outputs become low and high respectively. In this way, the high-level period of the Q output of the flip-flop 121 continues exactly for one horizontal period, resulting in a very stable pulse width.

In a field where a vertical synchronizing signal is inserted as shown in FIG. 3(a), a pulse is produced also in the 7th horizontal period as shown in FIG. 3(g), and in a field as shown in FIG. 3(b), a pulse is produced only in the fifth horizontal period as shown in FIG. 3(h). Therefore, a field may be discriminated also by the pulse generated in the 7th horizontal period.

As explained above, the counter circuit 3 produces a vertical detection pulse very stable both in timing and in pulse width in either field.

We claim:

1. A vertical synchronizing signal detector comprising:
   (a) means for receiving a composite synchronizing signal including a horizontal synchronizing signal and a vertical synchronizing signal,
   (b) means for generating a horizontal reference pulse synchronized with a horizontal synchronizing signal and in a predetermined phase relationship with said horizontal synchronizing signal, and a multiplied pulse obtained by multiplying said horizontal reference pulse, said pulse generator means being connected with said receiving means,
   (c) latch means connected with said receiving means and said pulse generator means, said latch means producing and holding the level of the composite synchronizing signal at the time of a level change of said multiplied pulse till the level change of the next multiplied pulse,
   (d) AND means for producing a logic product of the output of said latch means and said multiplied pulse, and
   (e) counter-discriminator means for counting the output pulses from said AND means during a period between adjacent horizontal reference pulses and generating a detection signal when the count thereof exceeds a predetermined value.

2. A vertical synchronizing signal detector according to claim 1, wherein said counter-discriminator means includes a counter for counting the output pulses produced from said AND means and control means for resetting said counter by a horizontal reference pulse and detecting and cancelling the reset condition immediately after the counter is reset.

3. A vertical synchronizing signal detector according to claim 1 or 2, wherein the detection signal once generated is held till the generation of the immediately succeeding horizontal reference pulse.

4. In a vertical synchronizing signal detector comprising:
   (a) a synchronizing signal source for outputting a composite synchronizing signal including a horizontal synchronizing signal and a vertical synchronizing signal, each synchronizing signal having a reference level;
   (b) a pulse source for generating a clock pulse of a frequency higher than that of the horizontal synchronizing signal; and
   (c) counting means having an input terminal for counting the number of pulses supplied to said input terminal during each recurrent period of horizontal synchronizing signal and for producing a detection signal when the counted number exceeds a predetermined value;
   the improvement which comprises:
   (d) latch means supplied with said composite synchronizing signal and said clock pulse for sampling the level of said composite synchronizing signal at a predetermined incidence of each said clock pulse and holding the thus-sampled level till the next sampling at the predetermined incidence of a succeeding clock pulse, so that a latched signal whose presence substantially corresponds to the presence of the synchronizing signals at the reference level is obtained;
   (e) gate means connected between said pulse source and said input terminal of said counting means for allowing said clock pulse to pass therethrough during the presence of said latched signal output from said latch means and for preventing said clock pulse from passing therethrough during the absence of said latched signal.

5. A vertical synchronizing signal detector comprising:
   (a) reference pulse generator means supplied with a horizontal synchronizing signal included in a composite synchronizing signal for generating a horizontal reference pulse which is synchronized with and in a predetermined phase relationship with said horizontal synchronizing signal, and a multiplied pulse obtained by multiplying said horizontal reference pulse;
   (b) latch means supplied with the composite synchronizing signal and the multiplied pulse for producing a latched pulse whose level is corresponding to a level of the composite synchronizing signal at every sample time which is either of commencement and termination of the multipled pulse and is held till change in the level of the composite synchronizing signal occurs at a subsequent sample time, so that the thus-produced latched pulse has a length which substantially corresponds to that of the horizontal and vertical synchronizing signals;
   (c) AND means for producing a logic product of the latched pulse and the multiplied pulse; and
   (d) counter-discriminator means for counting the number of the multiplied pulse output from said AND means during each period of time of repetition of said horizontal reference pulse and for generating a detection signal whenever the counted number exceeds a predetermined value.

* * * * *